March 27, 1962     N. Z. ALCOCK ET AL     3,027,459
THICKNESS MEASUREMENT APPARATUS
Filed Dec. 9, 1958

INVENTOR.
NORMAN Z. ALCOCK
BY GEOFFREY J. LEIGHTON

Norbert Ederer
their attorney

United States Patent Office 3,027,459
Patented Mar. 27, 1962

3,027,459
THICKNESS MEASUREMENT APPARATUS
Norman Z. Alcock and Geoffrey J. Leighton, Oakville, Ontario, Canada, assignors, by mesne assignments, to Curtiss-Wright Corporation, New York, N.Y., a corporation of Delaware
Filed Dec. 9, 1958, Ser. No. 779,131
Claims priority, application Canada Aug. 9, 1958
11 Claims. (Cl. 250—83.6)

This invention relates to apparatus including a radio isotope and ionization chamber for measurement of the thickness or mass per unit area of a subject material by measuring the radiation unabsorbed by the material and detected in the ionization chamber.

The invention is particularly directed to improvements in continuous sheet measuring apparatus as set forth in a U.S. patent of ours and of R. F. Maskell, No. 2,675,843, granted on April 13, 1954. In such prior apparatus the mass per unit area measurement was usually calibrated as thickness for convenience. Accordingly the same substitution of terminology may be employed in this specification.

The measurement of the mass per unit of area of a subject sheet material disposed between a radiation source and an ionization chamber serving as a detector for residual radiation arriving thereon after passage through the subject material is characterized in a general sense by the following factors, which may give rise to relatively large errors:

(a) The subject material may vary in its spacing between the radiation source and the detector giving rise to substantial errors due to a shift or change in location of the subject material.

(b) Where precise measurements are required the physical support of the source material relative to the detector may vary slightly due to exterior vibration effects, in particular where it is desired that the detector and source be moved together on some conveying arrangement. Variations in separation of the detector and source may give rise to substantial errors of measurement requiring high precision machining and rigid assembly of physical components.

(c) The composition of the material being measured may in itself give rise to substantial errors. Depending upon the composition of the material being examined, there may occur a greater or lesser degree of so-called elastic scattering of rays from the atomic nucleus of the material. Ordinarily the residual ray energy being measured in the class of measuring system considered herein is a function of the atomic number divided by the atomic weight of the subject material. However, under conditions of elastic scattering the residual energy measured may be comprised partially of a function of the square of the atomic number divided by the atomic weight. As a result with materials, for example materials containing sulphur, elastic scattering may occur as a characteristic of subjection of the material to radiation, in particular beta rays, such that the effect on elastic scattering is sufficiently large to give rise to substantial errors in measurements which otherwise would be dependent upon the measurement of residual radiation from orbital electron absorption.

(d) The half life of the source material selected is an insufficient criterion for the selection of suitable beta ray sources having regard to the rate of source decay and the effect thereof on a shift in amplitude of response of the measuring system. While some prior attempts have been made to compensate by corrective means for the rate of decay of the source in a measuring system of the general kind disclosed herein, the source decay characteristic has remained a problem which may account for substantial errors.

(e) The air gap existing between the source and the detector may vary in density due to temperature changes and changes in pressure, as well as chemical changes in some instances where impure air, gases or liquids constitute the medium. In the so-called air gap any variations in such medium may give rise to errors.

In our aforementioned Patent 2,675,843 we have described thickness measurement apparatus wherein the radiation detector is activated transversely and is provided with an angle of vision or acceptance greater than the angle of emission of the radiation source, but less than 180°. This arrangement substantially minimizes errors due to change in position of the subject material relative to the radiation source and detector. Also the therein described provision of a balancing radiation source and detector substantially compensates for errors due to source decay. These errors and also errors due to change in mass of the gap medium may be minimized by resort to the improved automatic null-balancing arrangement of the radiation sources and detectors described in a copending application of Norman Z. Alcock, one of the present applicants, Ser. No. 585,313, filed May 16, 1956, now Patent No. 3,010,020, dated November 21, 1961.

It is the main object of this invention to ovecome all of the remaining disadvantages and errors above outlined to minimize to a negligible quantity and/or obviate the effects of motion of the subject material between the source and detector, relative motion or vibration between the source and detector and to overcome the undesirable effects of the composition of the subject material.

While the invention is adapted for the direct measurement of a subject material it is also especially adapted for the continuous measurement of a moving sheet of material or of a coating on a moving sheet of material as described in the above mentioned Alcock patent.

We have discovered that reduction in error due to change in position of the subject material relative to source and detector is feasible to even greater extent than by the arrangement according to our above said Patent No. 2,675,843 by resort additionally or alternatively to a wide angle of source emission of the order of at least sixty degrees, the ionization chamber being masked by a total absorber over a central masked area of the order of about one-half the effective angle of emission. Such geometry is further effective to overcome errors due to change in position of the source relative to the chamber detector. The system of the invention is further characterized by means for overcoming the composition effect of the subject material in the form of an effective mask such as a one-half thickness absorber which may be provided as a physical masking solid substance entirely covering the radiation exposed area of the detector chamber, or alternatively may be provided as a gas under high pressure providing a density efficient as a one-half thickness absorber within the ionization chamber detector itself.

Having regard to the foregoing, other objects of the invention will be appreciated by a study of the following specification taken in conjunction with the accompanying drawings.

The apparatus hereinafter described is illustrated by way of example as of the transversely activated type, but it should be understood that the inventive concepts disclosed herein are also applicable to thickness measurement apparatus wherein the detector is activated axially or longitudinally. The apparatus is illustrated in simplified fashion; for further structural and circuit details forming no part of the present invention reference may be made to our aforesaid Patent No. 2,675,843 and Alcock patent.

Figure 1:
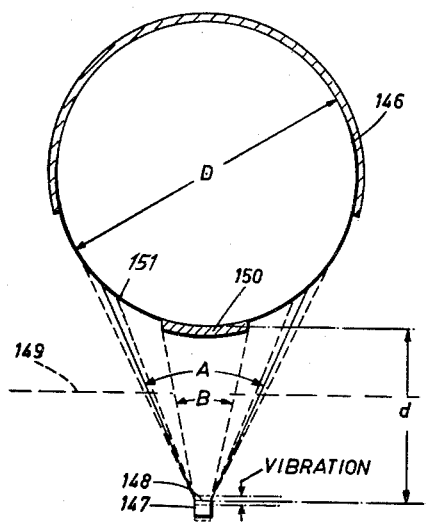
FIGURE 1 is a schematic diagram in transverse section, illustrating the effect of providing a mask according to the invention to compensate for a shift in the relative distance between the radiation source and the detector therefor.

Referring to FIGURE 1, the detector 146 may be activated by radiation source 147 which is fixed relative to the detector. A sheet when inserted at line 149 passes in the fixed gap $d$ and is subjected to radiation from source 147. The unabsorbed radiation energizes ionization chamber detector 146. The source is preferably formed of a beta emitting source material such as, for example, thallium 204 of 800 kilovolts and 20 millicuries of a physical size in the case of the source 147 of, for example, one inch in width and fourteen inches in length. When suitably incorporated in an electric circuit, for example, as shown in the said Alcock patent, the walls of ionization chamber 146 constitute an outer detector electrode, which cooperates with a coaxial inner electrode (not shown) to provide an electrical signal representative of the sheet thickness.

The detector 146 is shown spaced a distance $d$ from the beta ray emitting source 147. In accordance with the invention, the width $x$ of the beta ray emitting area 148 of the source 147 is preferably of the order of about one-twentieth the effective diameter D of the detector 146. Further, the separation of source and detector represented by the dimension $d$ is such that the angle A of the detector for omission or radiation from the source 147 is at least of the order of about sixty degrees. The angle of acceptance or vision of the detector 146 subtended by arc 151 is in accordance with the teaching of the said Patent 2,675,843, selected to be substantially greater than the emission angle A, but less than 180°. As a result of the described geometry the ray beam defined by angle A irradiates substantially less than the entire area available to accept radiation as defined by arc 151. By this means the line of positioning 149 of the subject material being examined between the source and the detector is rendered non-critical to such degree that placement thereof may vary to the order of one-tenth the distance between detector and source without giving rise to variations in measurements having a noticeable order of significance except in extremely precise measurement techniques. In any case errors arising from shifting of the subject material are effectively eliminated for nearly all practical purposes. Extreme geometry may compensate for extreme conditions of this kind.

Vibration effects may cause slight changes in the dimension $d$ giving rise to substantial errors. The invention provides for a separation mask 150 located centrally of the radiation exposed area 151 of the detector 146 and effectively covers approximately forty percent of the said exposed area where the area is of a cylindrical curved nature such as in the detector 146. In the geometry referred to the masked area subtends an angle B of one-half the source emission angle A of source 147, the latter being of the order of about sixty degrees and the former being of the order of about thirty degrees. The angle of radiation emission A from the source 147 is confined by known masking or focusing techniques to a value greater than about sixty degrees, which angle remains fixed, whereby an increase in the dimension $d$ will cause a greater area of the detector 146 to be energized. On the other hand if the distance $d$ is reduced, such as by vibration, the energized area of the detector 146 is reduced. The total absorber mask 150 therefore masks a proportionately greater energizable area of detector 146 at greater intensities of radiation when the dimension $d$ is smaller, and masks a proportionately smaller relative portion of the exposed area of the detector 146 when the dimension $d$ is greater and the intensity of radiation received by the detector is less, giving rise effectively to a constant energizing of the detector during vibrator or other dimensional variance of the dimension $d$. The effect of the inverse square law of radiation energy on a variation in the spacing between the source and detector is therefore effectively obviated.

It is often assumed that the ray energy absorbed by a subject material subjected to beta radiation is a function of the atomic number divided by the atomic weight of the subject material. However, in some atoms more than in others, a ray may strike the nucleus of the atom causing deflection of the ray, in such manner that the absorbed energy more closely approximates a function of the square of the atomic number divided by the atomic weight. Accordingly, orbital electron absorption within an atom may be substantially different in magnitude from so-called absorption by the nucleus. In result, different atoms of similar atomic number and similar atomic weight may demonstrate substantially different effective absorption of beta ray emission.

It has been found in arriving at this invention that a substantial reduction of the angle of emission A, such as by collimating the emission, accentuates this effect to a degree largely confining the sensitivity of the measuring system to a function of the square of the atomic number divided by the atomic weight. On the other hand, as preferred according to this invention for most applications, a relatively wide emission angle of sixty degrees or greater tends to reduce the effect of errors arising due to differences in composition of materials of similar atomic number and atomic weight. Thus, for example, sulphur occurring in rubber is an example of a material which gives rise to erroneous mass per unit area readings unless the effect of substantial deflection of beta rays by the nucleus of the sulphur atom is taken into account as a function of the square of the atomic number divided by the atomic weight.

Figure 2:
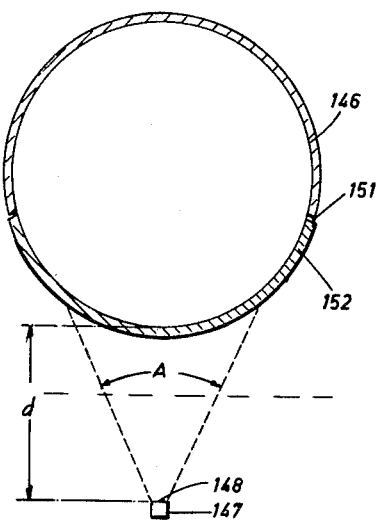
FIGURE 2 is a diagrammatic illustration in transverse section of one preferred form of masking means according to the invention adapted to overcome elastic scattering characteristics of rays from subject material.

There is no ready method of compensating for this error without knowing the degree of the effect for all of the various materials which might be encountered. No such information is available for a wide range of known and ordinarily encountered substances in such form that ready compensation could be made in measurements of the kind contemplated. The invention contemplates this fact by causing the beta rays arriving from the subject material to come to a stop in their path of travel within the ionization chamber to accentuate the sensitivity of the system to the mass per unit area of the material being examined, in such manner that the ordinary function of the atomic number divided by the atomic weight is rendered largely dominant in the measurement made. This is accomplished, as illustrated in FIGURE 2, by providing a half thickness absorber 152 adapted to cover the entire exposed area 151 of the detector 146.

The total absorber 150 as well as the half-thickness absorber may be formed of any radiation absorbing material. We prefer to employ aluminum or steel, as these materials serve physically to protect the ionization chamber radiation openings in addition to absorbing radiation.

Figure 3:
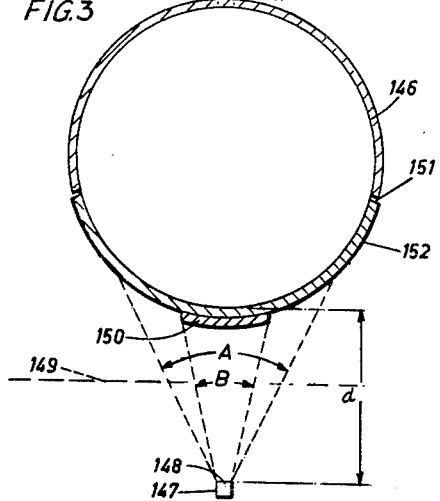
FIGURE 3 is a diagram in transverse section of a preferred masking arrangement according to the invention embodying both of the masking means of FIGURES 1 and 2.

The invention therefore contemplates a complete correction for errors in subject material placement, errors arising from change in distance between the source and detector, and errors which may arise due to differences in composition of the material being examined by the organization of features of the invention illustrated in FIGURE 3, wherein the detector 146 is shown supporting an exposure area mask 152 and a separation error mask 150, which, in conjunction with the geometry of the angles A, B, and the separation dimension as described, accomplishes the results desired and achieves the objects set forth herein.

Figure 4:
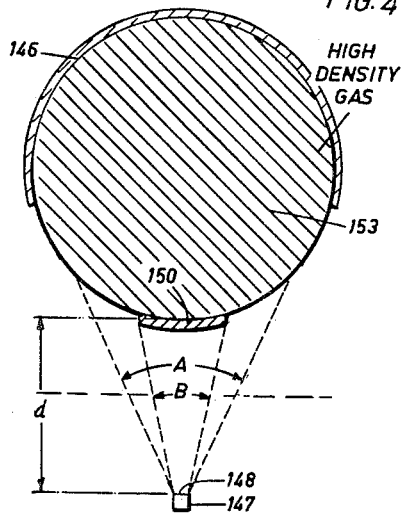
FIGURE 4 is a modification of FIGURE 3 illustrating the substitution of high density gas for the masking element of FIGURE 3, in which the high density gas in the ionization chamber is deemed an equivalent masking means to that of the physical means of FIGURE 3.

As a modification of the invention a substitute for the exposed area half thickness absorber mask 152 may be found in the provision of a high density gas, indicated by shade lines 153, in the detector 146 of FIGURE 4. Inert gases may be employed advantageously, especially argon, xenon or krypton under pressure, preferably, of from one to three atmospheres. Gas under pressure in the ionization chamber may effectively provide a one-half thickness absorber adapted to arrest the travel of beta rays thereby effectively to confine them to the interior of the detector when received, thus to accentuate the ordinary function of the atomic number divided by the atomic weight as a measure of the absorption of Beta rays by the subject material. It is to be understood that in referring to the ratio of the atomic number divided by the atomic weight herein the said ratio, being a number only, may be regarded generally only as a function of the absorption of Beta ray energy by the subject material. The remaining energy left to energize the detector is thus the total energy of emission from the source less the energy absorbed by the subject material, and to this extent is likewise a general function of the ratio described.

It should be understood that this invention is not limited to specific details of construction and arrangement thereof herein illustrated, and that changes and modifications may occur to one skilled in the art without departing from the spirit of the invention.

What is claimed is:

1. In a ray energy system for measuring the mass per unit area of a subject material and utilizing an ionization chamber having an exposeable area and spaced a substantially fixed distance from a ray emitting source comprising a radioisotope: a total absorber masking a portion of the ray exposable area of said ionization chamber from said source, said source having an effectively wide angle of emission and being normally spaced from said chamber a distance so as to irradiate substantially less than the entire energizable surfaces of said chamber to provide for an increased total exposure of said chamber to said rays upon increase of the spacing between said source and said chamber and a decrease in the exposed area of said chamber upon a decrease of the distance between said source and said chamber thereby substantially to obviate effects of changes in said spacing due to vibration and the like.

2. The system according to claim 1 in which the angle of emission of said source has a minimum magnitude of about sixty degrees.

3. The system according to claim 1 in which the total absorber masks an angular spread of approximately one half the angle of source emission.

4. The system according to claim 1 in which the total absorber consists of at least one material selected from the group consisting of steel and aluminum.

5. The system claimed in claim 1 and a half thickness absorber associated with said ionization chamber and adapted effectively to accentuate orbital absorption of rays by the subject material.

6. The system as claimed in claim 5 in which the half thickness absorber is in the form of a mask-like solid entirely covering the exposable area of the ionization chamber.

7. The system according to claim 6 in which the mask-like solid consists of at least one material selected from the group consisting of steel and aluminum.

8. The system according to claim 5 in which the half thickness absorber is in the form of a gas under pressure within said ionization chamber.

9. The system according to claim 8 in which the gas pressure is from one to three atmospheres.

10. The system according to claim 8 in which the gas is essentially composed of at least one inert gas selected from the group consisting of argon, krypton and xenon.

11. In a ray energy system for measuring the mass per unit area of a subject material: a ray emitting source comprising a radioisotope having an angle of emission whose minimum magnitude is about 60°, an ionization chamber irradiated by said source and having a ray exposable area defined by an angle of acceptance greater than said angle of emission but less than 180°, and a total absorber masking approximately forty percent of said exposable area, said source and chamber being spaced from one another at a substantially fixed distance such that said total absorber masks so much of said exposable area as intercepts approximately one half of said angle of emission, whereby measurement errors due to change in said spacing and due to change in position relative to said source and chamber of said subject material when inserted therebetween are substantially eliminated.

References Cited in the file of this patent

UNITED STATES PATENTS

| | | |
|---|---|---|
| 2,675,483 | Leighton | Apr. 13, 1954 |
| 2,883,552 | Faulkner | Apr. 21, 1959 |
| 2,884,537 | Swift | Apr. 28, 1959 |